United States Patent [19]

Will

[11] 4,133,738
[45] Jan. 9, 1979

[54] ELECTRODE WITH A GRADED ELECTRICAL RESISTANCE SUBSTRATE

[75] Inventor: Fritz G. Will, Scotia, N.Y.

[73] Assignee: General Electric Company, Schenectady, N.Y.

[21] Appl. No.: 816,480

[22] Filed: Jul. 18, 1977

[51] Int. Cl.² .................. C25B 11/12; C25C 1/16
[52] U.S. Cl. ......................... 204/294; 204/114
[58] Field of Search ............ 204/280, 294, 114; 429/233

[56] References Cited
U.S. PATENT DOCUMENTS

| 1,309,148 | 7/1919 | Michel | 204/294 X |
| 2,604,441 | 7/1952 | Cushing | 204/280 X |
| 3,330,756 | 7/1967 | Ransley | 204/294 X |
| 3,846,174 | 11/1974 | Barrett | 429/233 X |

Primary Examiner—John H. Mack
Assistant Examiner—D. R. Valentine
Attorney, Agent, or Firm—Paul R. Webb, II; Joseph T. Cohen; Charles T. Watts

[57] ABSTRACT

An electrode is described which includes a current collector and a porous conducting substrate. The electric resistance of the conducting substrate is varied generally by a shaped structure resulting in low and high electrical resistance portions. The improved electrode increases the uniformity of electrodeposited zinc thereon.

2 Claims, 2 Drawing Figures

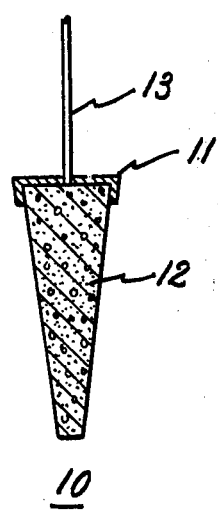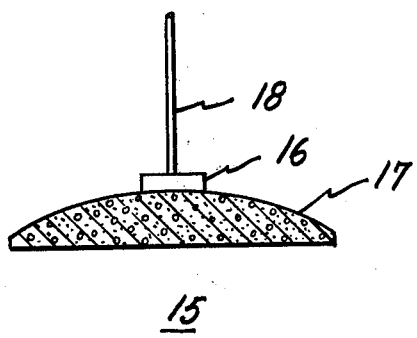

ELECTRODE WITH A GRADED ELECTRICAL RESISTANCE SUBSTRATE

This invention relates to electrodes and more particularly, to electrodes with graded electrical resistance substrates.

Electrodes, onto which zinc is deposited, are employed in electroplating and in zinc galvanic cells, such as, rechargeable zinc-halogen cells. In either the electroplating process or during zinc deposition in rechargeable zinc-halogen cells, the zinc is electrodeposited non-uniformly onto the conducting substrate of the electrode. More zinc is deposited near the edges than near the center: edge effect. More zinc is deposited near the bottom than near the top: gravitation effect. More zinc is deposited next to the opposite electrode than away from it: ohmic effect. Such non-uniform zinc distribution leads to considerable problems, for example in the cycling of zinc cells in general, namely to a loss of efficiency, a gradual decrease of the capacity and sometimes to electrical cell shorting.

The present invention is directed to electrodes with graded electrical resistance substrates to overcome the above problems of non-uniform zinc deposition.

The primary object of my invention is to provide electrodes for electroplating and rechargeable zinc cells wherein more uniform zinc deposition is accomplished.

In accordance with one aspect of my invention, an electrode includes a current collector and a graded electrical resistance substrate.

These and various other objects, features and advantages of the invention will be better understood from the following description taken in connection with the accompanying drawing in which:

FIG. 1 is a sectional view of an electrode with a graded electrical resistance substrate made in accordance with my invention; and FIG. 2 is a sectional view of a modified electrode with a graded electrical resistance substrate.

In FIG. 1 of the drawing, there is shown generally at 10 an electrode with a graded electrical resistance substrate made in accordance with my invention. Electrode 10 comprises a copper, tin, carbon, or graphite current collector 11 and a porous conducting substrate 12. Porous conducting substrate 12 is a graded electrical resistance structure which is accomplished by tapering the substrate from the top, thick portion, to the bottom, thin portion, as viewed in this Figure. The top or thick portion has a low electrical resistance while the bottom or thin portion has a high electrical resistance. Current collector 11 is made of a metal, such as copper or tin, or of carbon or graphite and is clamped or cemented onto porous substrate 12. Suitable conductive cements include carbon cements, for example, Dylon grade GC or Union Carbide grade C-34 carbon cement. A suitable wire or carbon rod 13 is connected to collector 11 and makes connection to the exterior electrical circuit, not shown. The resulting electrode is made in accordance with my invention to provide subsequent uniform zinc deposition.

In FIG. 2 of the drawing, there is shown generally at 15 a modified electrode with a graded electrical resistance substrate made in accordance with my invention. Electrode 15 comprises a copper, carbon, or graphite current collector 16 and a porous conducting substrate 17. Porous conducting substrate 17 is a graded electrical resistance structure which is accomplished by providing the substrate with a disk-shape, having a thick portion near the center and thin portions near the edges. The center portion has a low electrical resistance while the edge portions have a high electrical resistance. Current collector 16 is made of a metal, such as copper or tin, or of carbon or graphite and is clamped or cemented onto porous substrate 17. Conductive carbon cements as described for FIG. 1 are suitable. A suitable wire or carbon rod 18 is connected to collector 16 and makes connection to the exterior electrical circuit, not shown. The resulting electrode is made in accordance with my invention to provide subsequent uniform zinc deposition.

I found that I could form an electrode with greater uniformity of zinc deposition thereon, which electrode includes a current collector and a porous graded electrical resistance conducting substrate in electrical contact with one surface of the current collector. The porous conducting substrate in accordance with my invention has low and high electrical resistance portions. I found further that the conducting substrate could be produced in a number of configurations to provide both the low and high electrical resistance portions.

The current collector can be made of a variety of metals and non-metallic materials which are electrically conducting. For example, suitable metals include copper, tin, tantalum, and niobium. Suitable non-metallic materials include carbon and graphite. The porous conducting substrate can be made of carbon, graphite, or carbon foam or mesh and is in electrical contact with one surface of the current collector. Such an electrode is suitable for employment in electroplating processes and in various types of rechargeable zinc cells, such as zinc-halogen cells.

The conducting substrate may be formed as mentioned above by shaping the conducting substrate. In addition, the density or filament thickness of the carbon foam or mesh can be varied to provide one portion with a low electrical resistance while the other portion has a high electrical resistance. The upper part of the shaped substrate, as shown in FIG. 1 or the center part of the shaped substrate as shown in FIG. 2 is in contact with the current collector. The portion of the conducting substrate next to the current collector has a low electrical resistance while the other portion or portions of the conductive substrate has a high electrical resistance.

Examples of electrodes with graded electrical resistance conducting substrates made in accordance with my invention are set forth below:

EXAMPLE I

An electrode was formed which comprised a copper foil current collector and a porous conducting substrate of carbon foam affixed to the top portion thereof thereby providing electrical contact therebetween as shown in FIG. 1. The porous conducting substrate as viewed in FIG. 1 had an upper portion of thick dimensions, approximately 5 mm, which had a low electrical resistance and was tapered toward the lower portion to a thickness of approximately 1 mm, which had a high electrical resistance. A second electrode which comprised a piece of zinc foil was also provided. These two electrodes were immersed in an aqueous solution consisting of 28.6% $ZnBr_2$, 14.3% KBr, and 14.3% NaCl and had electrical leads connected to the current collectors. A current density of 10 milliamperes per $cm^2$ was provided from a power source across the leads to the respective electrodes resulting in electrodeposition of zinc on the porous conducting substrate which was made the negative electrode. After 16 hours, the current was terminated. The improved electrode of my invention was visually examined. It was noted that a considerably more uniform layer of zinc had been deposited thereon than would be deposited on a conventional electrode not made in accordance with the invention.

EXAMPLE II

An electrode was made which comprised a graphite current collector disk, a graphite rod to conduct the current to the exterior circuit and a shaped carbon foam substrate. The substrate was a disk shaped to have an inner thick region and outer thin regions and was affixed to the current collector by clamping the substrate with its inner thick region between the collector disk and the graphite rod by the use of a graphite screw. This electrode, made in accordance with the invention as shown in FIG. 2, was immersed in an aqueous solution of 14.3% by weight each of $ZnBr_2$, KBr, and $CaCl_2$. A second electrode of vitreous carbon foam was immersed into an electrolyte with the same salts but in addition containing 10% $Br_2$ by weight. Both electrodes in their respective solutions were separated by a Nafion cation exchange membrane of sulfonated polytetrafluoroethylene made by the DuPont Corporation, Wilmington, Del. On connecting the cell to an external power supply, making the electrode of the invention the negative electrode, zinc was electrodeposited on that electrode whereas $Br_2$ was formed at the other electrode. The cell thus became a rechargeable $Zn/Br_2$ cell and was charge/discharge cycled repeatedly with a current density of 25 ma/cm$^2$. Each charge and discharge had a duration of 1 hour and 20 minutes. The electrolyte was slowly circulated through the electrode of the invention. After many hundred cycles, the electrode was examined with regard to the zinc distribution across the porous substrate surface. It was found that the zinc was distributed much more uniformly across the substrate surface than would be the case for conventional substrates. Such conventional substrates show more zinc deposition near the edges and near the lower portions.

While other modifications of the invention and variations thereof which may be employed within the scope of the invention have not been described, the invention is intended to include such as may be embraced within the following claims:

What I claim as new and desire to secure by Letters Patent of the United States is:

1. An electrode comprising a current collector, a graded electrical resistance conducting substrate, the substrate having a low resistance thicker portion of dense carbon foam and a high resistance thinner portion of less dense carbon foam, and the substrate having a surface of the low resistance portion in electrical contact with the current collector.

2. An electrode comprising a current collector, a graded electrical resistance conducting substrate, the substrate having a low resistance center portion of dense carbon foam and high resistance edge portions of a less dense carbon foam.

* * * * *